(12) United States Patent
Roy et al.

(10) Patent No.: US 8,142,951 B2
(45) Date of Patent: Mar. 27, 2012

(54) MONOPOLAR FUEL CELL ENDPLATE AND FUEL CELL COMPRISING SAME

(75) Inventors: Francis Roy, Les Ulis (FR); Jean-Philippe Poirot-Crouvezier, Saint Georges de Commiers (FR)

(73) Assignees: Peugeot Citroen Automobiles SA, Valizy Villacoublay (FR); Commissariat a l'Energie Atomique et aux Energies Alternatives, Paris (FR)

( * ) Notice: Subject to any disclaimer, the term of this patent is extended or adjusted under 35 U.S.C. 154(b) by 1011 days.

(21) Appl. No.: 11/993,850

(22) PCT Filed: Jun. 23, 2006

(86) PCT No.: PCT/FR2006/001462
§ 371 (c)(1), (2), (4) Date: Mar. 20, 2008

(87) PCT Pub. No.: WO2007/003745
PCT Pub. Date: Jan. 11, 2007

(65) Prior Publication Data
US 2010/0098982 A1  Apr. 22, 2010

(30) Foreign Application Priority Data
Jun. 28, 2005 (FR) ..................... 05 06602

(51) Int. Cl.
 *H01M 2/38* (2006.01)
 *H01M 2/40* (2006.01)
 *H01M 8/24* (2006.01)

(52) U.S. Cl. .......... 429/457; 429/433; 429/463

(58) Field of Classification Search ............ 429/457, 429/433, 463
See application file for complete search history.

(56) References Cited

U.S. PATENT DOCUMENTS
6,358,642 B1 * 3/2002 Griffith et al. ............... 429/480
2003/0194597 A1 10/2003 Ganski et al.

FOREIGN PATENT DOCUMENTS
FR  2844922 A  3/2004
WO  WO 2004032267 A  4/2004

OTHER PUBLICATIONS
International Search Report mailed Nov. 16, 2006 in PCT/FR2006/001462.

* cited by examiner

*Primary Examiner* — Patrick Ryan
*Assistant Examiner* — Julian Anthony
(74) *Attorney, Agent, or Firm* — Nicolas E. Seckel

(57) ABSTRACT

The invention concerns a monopolar fuel cell endplate (4) of the type with proton exchanging membrane consisting of a cathode or anode monopolar half-plate (41) attached to a closure plate (42). The monopolar half-plate comprises, in its central part, a cathode or anode active region (411), and, at its periphery, at least two oxidant boxes, if the monopolar half-plate is cathodic, or fuel boxes, if the monopolar half-plate is anodic. Each oxidant or fuel box comprises at least one channel (414) emerging outside the active region (411) to enable oxidant or fuel to be circulated outside the monopolar plate on the monopolar plate side, the oxidant or fuel boxes not comprising an opening emerging into the central region of the closure plate, such that the central part of said closure plate is not swept either with fuel or with oxidant.

20 Claims, 2 Drawing Sheets

MONOPOLAR FUEL CELL ENDPLATE AND FUEL CELL COMPRISING SAME

BACKGROUND OF THE INVENTION

The present invention relates to a monopolar end-plate for a fuel cell of the type having a proton-exchange membrane.

A fuel cell having a proton-exchange membrane is a device for producing electricity by means of an electrochemical reaction between a fuel, for example, a gas containing hydrogen, and an oxidant, for example, a gas containing oxygen, separated by a wall which is constituted by a solid electrolyte.

In a device of this type, when the fuel is a hydrogenous gas and the oxidant is an oxygenous gas, the hydrogenous gas and the oxygenous gas react in order to form water whilst generating an electrical current which may be used for various applications.

Generally, a fuel cell is constituted by a stack of reactive cells or elementary cells which are each constituted by an electrode/membrane assembly which is inserted between two bipolar plates which comprise channels which are intended for the circulation of, on the one hand, a fuel and, on the other hand, an oxidant, and finally a heat-exchange fluid such as water. The electrode/membrane assembly is a multi-layer material which is known per se and which comprises a layer which is constituted by a membrane of solid electrolyte which is itself arranged between two active layers which constitute, on the one hand, a cathode and, on the other hand, an anode, which are themselves coated with two outer layers and a diffusion layer.

The stack of elementary cells is generally retained in a state secured between two terminal plates which are flange-mounted by means of pins which extend from one terminal plate to the other and which extend through the stack of elementary cells.

At one of the ends of the fuel cell, an anode monopolar plate is located which is fitted to a current collector and, at the other end, a cathode monopolar plate which is fitted to another current collector. The assembly is held mechanically by the terminal plates and tensile rods of the assembly.

Generally, monopolar end-plates are produced from materials which provide good properties of resistance to corrosion and which have good electrical conductivity, such as, for example, carbon-containing materials such as graphite, graphite impregnated with polymer or flexible sheets of graphite.

These components are generally shaped by means of machining or moulding in order to define, on the one hand, on an active face, circulation channels for reactive gases and, on the opposing face, a surface for contact with the current-collecting plates.

This technique has the disadvantage in particular of requiring the production of specific monopolar end-plates which are distinguished from the bipolar plates produced for the stack assembly of the cell. The costs are consequently significantly increased.

SUMMARY OF THE INVENTION

The object of the present invention is to overcome this disadvantage by providing a monopolar end-plate for a fuel cell having a proton-exchange membrane which comprises bipolar plates which are constituted by assemblies of bipolar half-plates which are obtained by means of drawing and which can be produced using more economical methods than the methods for producing known monopolar end-plates.

To this end, the invention relates to a monopolar end-plate of a fuel cell of the type having a proton-exchange membrane, constituted by a cathode or anode monopolar half-plate which is secured to a closure plate, the monopolar half-plate comprising, in the central portion thereof, an active cathode or anode zone and, at the periphery thereof, at least two units for an oxidant, if the monopolar half-plate is a cathode, or units for fuel if the monopolar half-plate is an anode, each oxidant or fuel unit comprising at least one channel which opens at the outer side of the active zone in order to allow the circulation of the oxidant or fuel outside the monopolar plate at the side of the monopolar half-plate, the oxidant or fuel units not comprising any opening which opens in the central zone of the closure plate so that the central portion of the closure plate cannot be touched by either the fuel or the oxidant.

Preferably, at least the monopolar half-plate comprises, at the periphery thereof, at least two heat-exchange fluid units and the central portion of the monopolar half-plate and the central portion of the closure plate together delimit a space for circulation of the heat-exchange fluid which is in communication, via connection channels, with the heat-exchange fluid units.

The central portion of the closure plate may be identical to the central portion of a cathode or anode monopolar half-plate, depending on whether the monopolar half-plate to which it is secured is an anode or a cathode, respectively.

The closure plate may be a current-collecting plate.

Preferably, at least one end assembly comprises a monopolar end-plate according to the invention and a means for collecting electrical current.

The means for collecting current is, for example, a current-collecting plate which comes into contact with the closure plate of the monopolar end-plate.

The end assembly may further comprise an inter-peripheral seal which provides the sealing between the monopolar end-plate and the means for collecting electrical current and a terminal plate.

BRIEF DESCRIPTION OF THE DRAWINGS

The invention will now be described in a more precise but non-limiting manner with reference to the appended drawings, in which.

DETAILED DESCRIPTION OF PARTICULAR EMBODIMENTS

Figure 1:
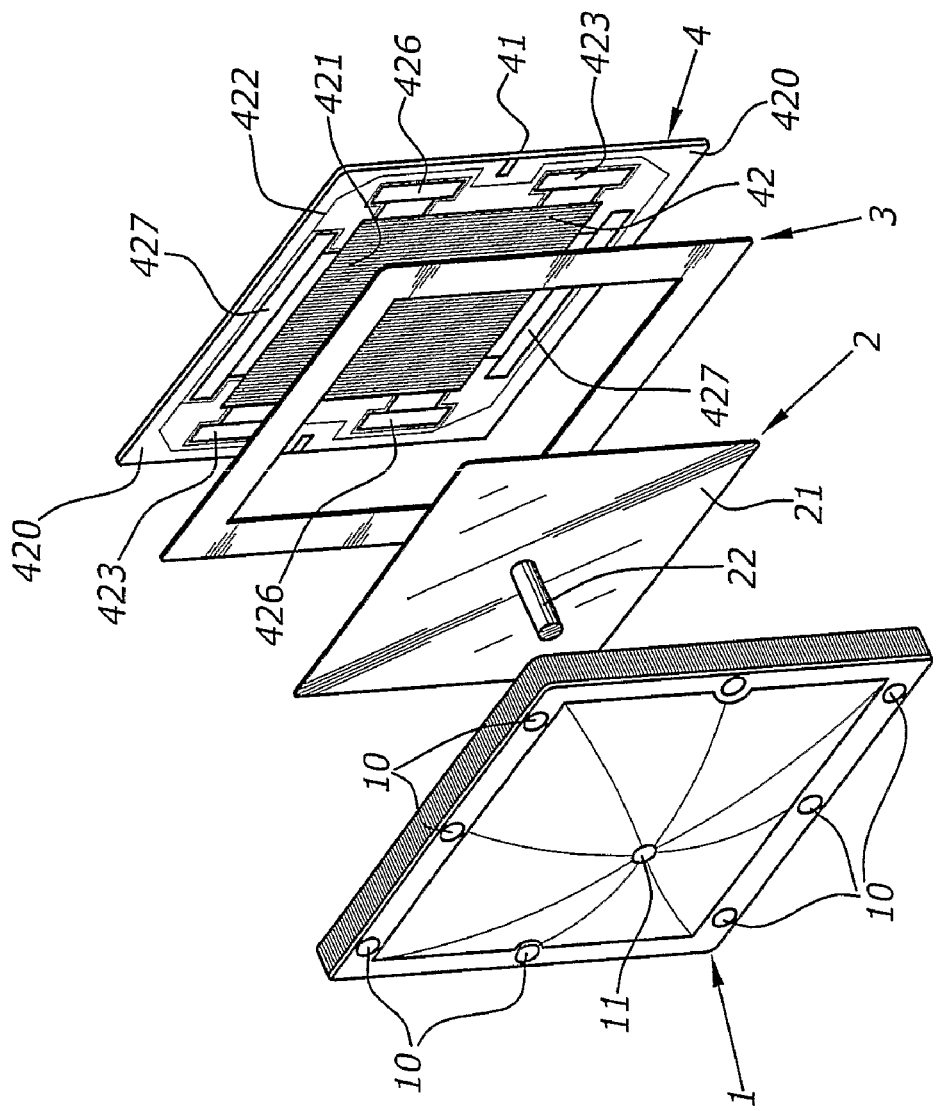
FIG. 1 is an exploded perspective rear three-quarter view of an end assembly of a fuel cell having a proton-exchange membrane.
Figure 2:
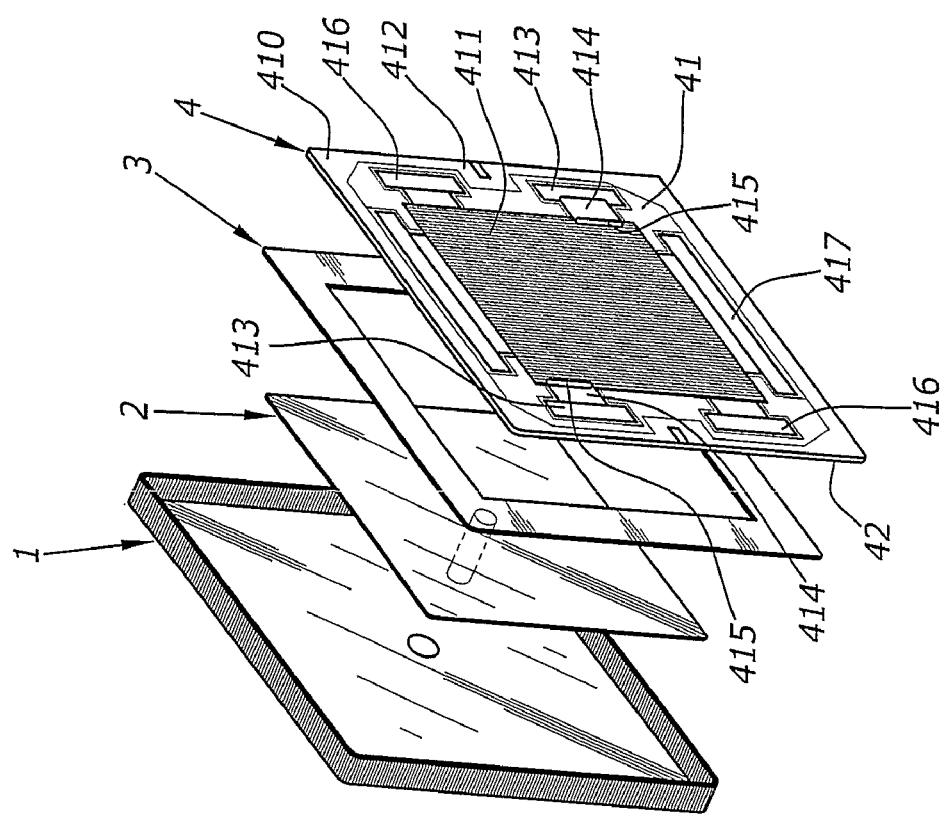
FIG. 2 is an exploded perspective front three-quarter view of the same end assembly of a fuel cell as that which is illustrated in FIG. 1.

The end assembly of a fuel cell illustrated in FIGS. 1 and 2 is constituted by a stack comprising a terminal plate 1, a current-collecting plate 2, a peripheral seal 3 and a monopolar end-plate 4 which comprises an active face 41 which is intended to co-operate with a reactive electrode/membrane assembly, and a rear closure face 42 which is intended to be in contact with the current-collecting plate 2.

The monopolar end-plate 4 is constituted by the assembly of two half-plates 410 and 420. The half-plate 410 corresponding to the active face 41 is a cathode or anode monopolar half-plate depending on whether the end assembly is an assembly which is intended to be placed at the cathode end or at the anode end of the fuel cell, respectively. This cathode or anode monopolar half-plate is identical to a cathode or anode monopolar half-plate of a bipolar plate of the fuel cell.

The cathode or anode monopolar half-plate 410 comprises an active central portion 411 which is constituted by channels obtained by means of drawing, and which is surrounded by a peripheral frame 412, comprising openings 413 which are intended to receive an active fluid which is either oxidant if the monopolar half-plate is a cathode half-plate, or fuel if the half-plate is an anode half-plate.

These openings 413 which are intended to circulate the active fluid longitudinally along the fuel cell, are connected, by means of channels 414, to openings 415 which open at the outer side of the monopolar half-plate in order to allow the active fluid to circulate which arrives via the collector openings 413 which constitute fluid units at the surface of the central active zone 411 of the monopolar half-plate.

The monopolar half-plate also comprises peripheral openings 416 which are intended to form units with active fluid which complements the active fluid which is supplied by the fluid units 413. When the monopolar half-plate 410 is a cathode, the fluid units 416 are intended to supply the cell with fuel and, conversely, when the monopolar half-plate is an anode, the fluid units 416 are intended to convey the oxidant. These fluid units 416 do not open at the surface of the monopolar half-plate, so that with this arrangement, when the cell is supplied with fluid, the active surface 411 of the monopolar half-plate 410 is supplied only with the fluid which corresponds to the nature of the half-plate of the relevant monopolar end-plate.

The second face 42 of the monopolar end-plate 4 is constituted by a monopolar plate 420 which complements the monopolar plate 410 located on the active face which comprises a central zone 421 which is identical to an active central zone of a bipolar plate, this active central region 421 being of the cathode type if the active central zone 411 of the monopolar half-plate 410 is an anode and the reverse if the half-plate 410 is a cathode. The half-plate 420 comprises a periphery 422 which surrounds the central region 421. This periphery 422 comprises, in the same manner as the monopolar half-plate 410, corresponding openings 423 and 426 which are intended to co-operate with the openings 413 and 416 of the monopolar half-plate 410 in order to form the active fluid units. This half-plate 420 which constitutes a closure plate is distinguished from a monopolar half-plate only by the fact that none of the openings 423 and 426 which constitute fluid units opens at the outer side of the central zone 421.

Consequently, the active fluids transported by the fluid units formed by the openings 423 and 426 cannot touch the outer surface of the central zone 421 of this closure plate.

The two active central zones 411 and 421 of the monopolar half-plate 410 and the closure plate 420 together delimit a space which allows the circulation of a heat-exchange fluid. This space is supplied with heat-exchange fluid via openings 417 and 427 which are provided in the peripheries of the monopolar half-plate 410 and the closure plate 420 and which are intended to form units for cooling fluid, these cooling fluid units being in communication with the space delimited between the two central zones of the monopolar half-plate and the closure plate via communication channels.

All of the plates obtained are plates which are produced from metal, which are cut and drawn in order to obtain the desired shapes and the monopolar half-plate secured to the closure plate is assembled therewith by means of welding, for example, by means of laser welding carried out in particular at the periphery of the plates.

It will further be noted that the periphery of the monopolar end-plate which has been described above is provided in order to be able to receive a seal 3 which provides the sealing of the assembly.

The current-collecting plate 2 is a planar metal plate which is intended to come into contact with the rear face of the closure plate 420 in order to collect the electrical current generated by the fuel cell. This collecting plate comprises, in the central portion thereof, a connection pin 22 which allows the fuel cell to be connected to an operating circuit.

Finally, the terminal plate 1 is a plate whose function is substantially mechanical. It comprises, at the periphery thereof, a plurality of openings 10 which are intended to receive, for example, tensile rods which serve to secure the stack which constitutes the fuel cell, between a terminal plate at the cathode side and the terminal plate at the anode side. This terminal plate also comprises, at the centre thereof, a hole 11 which is intended to allow the electrical connection pin 22 to pass in order to be able to provide an electrical connection of the fuel cell towards the outer side.

The stack which has been described above may be produced with different variants, in particular the openings which are provided at the periphery of the monopolar plate and which are not intended to supply this plate with active fluid may be closed.

Furthermore, for example, the outer connection pin of the fuel cell may be directly fixed to the closure plate of the monopolar end-plate. In this instance, the closure plate itself constitutes the current-collecting plate.

The invention claimed is:

1. Monopolar end-plate of a fuel cell of the type having a proton-exchange membrane, wherein said end-plate comprises:
    a cathode or anode monopolar half-plate and
    a closure plate,
    wherein the monopolar half-plate is secured to the closure plate,
    wherein the monopolar half-plate comprises, in a central portion thereof, an active cathode or anode zone and, at a periphery thereof, at least two units for an oxidant and at least two units for a fuel,
    wherein each of the oxidant units, if the monopolar half-plate is a cathode, or each of the fuel units, if the monopolar half-plate is an anode, comprises at least one channel which opens at an outer side of the active zone in order to allow the circulation of the oxidant, if the monopolar half-plate is a cathode, or fuel, if the monopolar half-plate is an anode, outside the monopolar plate at a side of the monopolar half-plate, and
    wherein the closure plate comprises, in a central portion thereof, a central zone which is identical to the active zone of the monopolar half-plate except that it is cathodic if the active zone of the monopolar half-plate is anodic and anodic if the active zone of the monopolar half-plate is cathodic,
    wherein none of the oxidant and fuel units of the monopolar half-plate comprises any opening which opens at an outer side of the central zone of the closure plate, so that the outer side of the central zone of the closure plate cannot be touched by any of the fuel and the oxidant.

2. Monopolar plate according to claim 1, wherein at least the monopolar half-plate comprises, at the periphery thereof, at least two heat-exchange fluid units and wherein the central portion of the monopolar half-plate and the central portion of the closure plate together delimit a space for circulation of a heat-exchange fluid which is in communication, via connection channels, with the heat-exchange fluid units.

3. Monopolar plate according to claim 2, wherein the closure plate is a current-collecting plate.

4. Fuel cell of the type comprising an alternate stack of electrode/membranes and bipolar plates which are secured between a cathode end assembly and an anode end assembly, wherein at least one end assembly comprises a monopolar end plate according to claim 3 and a means for collecting electrical current.

5. Fuel cell according to claim 4, wherein the means for collecting current is a current-collecting plate which comes into contact with the closure plate of the monopolar end-plate.

6. Fuel cell of the type comprising an alternate stack of electrode/membranes and bipolar plates which are secured between a cathode end assembly and an anode end assembly, wherein at least one end assembly comprises a monopolar end plate according to claim 2 and a means for collecting electrical current.

7. Fuel cell according to claim 6, wherein the means for collecting current is a current-collecting plate which comes into contact with the closure plate of the monopolar end-plate.

8. Monopolar plate according to claim 1, wherein the closure plate is a current-collecting plate.

9. Fuel cell of the type comprising an alternate stack of electrode/membranes and bipolar plates which are secured between a cathode end assembly and an anode end assembly, wherein at least one end assembly comprises a monopolar end plate according to claim 8 and a means for collecting electrical current.

10. Fuel cell according to claim 9, wherein the means for collecting current is a current-collecting plate which comes into contact with the closure plate of the monopolar end-plate.

11. Fuel cell of the type comprising an alternate stack of electrode/membranes and bipolar plates which are secured between a cathode end assembly and an anode end assembly, wherein at least one end assembly comprises a monopolar end plate according to claim 1 and a means for collecting electrical current.

12. Fuel cell according to claim 11, wherein the means for collecting current is a current-collecting plate which comes into contact with the closure plate of the monopolar end-plate.

13. Fuel cell according to claim 12, wherein the end assembly further comprises an inter-peripheral seal which provides the sealing between the monopolar end-plate and the means for collecting electrical current and a terminal plate.

14. Fuel cell according to claim 11, wherein the end assembly further comprises an inter-peripheral seal which provides the sealing between the monopolar end-plate and the means for collecting electrical current and a terminal plate.

15. Fuel cell comprising an alternate stack of electrode/membranes and bipolar plates which are secured between a cathode end assembly and an anode end assembly,
  wherein at least one of the end assemblies comprises a monopolar end plate according to claim 1,
  wherein at least one of the bipolar plates comprises a cathode monopolar half-plate and an anode monopolar half-plate,
  wherein the cathode monopolar half-plate is secured to the anode monopolar half-plate,
  wherein each of the monopolar half-plates of the bipolar plate comprises, in a central portion thereof, an active cathode or anode zone, respectively, and, at a periphery thereof, at least two units for an oxidant and at least two units for a fuel,
  wherein each of the oxidant or fuel units, respectively, of the respective monopolar half-plates of the bipolar plate comprises at least one channel which opens at the an outer side of the active zone of the respective monopolar half-plate in order to allow the circulation of the oxidant or fuel, respectively, outside the bipolar plate at a side of the respective monopolar half-plate, and
  wherein the central zone of the closure plate is identical to the active zone of the cathode monopolar half-plate of the bipolar plate, if the active zone of the monopolar half-plate is anodic, or to the active zone of the anode monopolar half-plate of the bipolar plate, if the active zone of the monopolar half-plate is cathodic.

16. Monopolar end-plate of a fuel cell of the type having a proton-exchange membrane, wherein said end-plate comprises:
  a cathode or anode monopolar half-plate, and
  a closure plate,
  wherein the monopolar half-plate is secured to the closure plate,
  wherein the monopolar half-plate comprises, in a central portion thereof, an active cathode or anode zone and, at a periphery thereof, at least two units for an oxidant and at least two units for a fuel,
  wherein each of the oxidant units, if the monopolar half-plate is a cathode, or each of the fuel units, if the monopolar half-plate is an anode, comprises at least one channel which opens at an outer side of the active zone in order to allow the circulation of the oxidant, if the monopolar half-plate is a cathode, or fuel, if the monopolar half-plate is an anode, outside the monopolar plate at a side of the monopolar half-plate, and
  wherein the closure plate comprises, in a central portion thereof, a central zone which is cathodic if the active zone of the monopolar half-plate is anodic and anodic if the active zone of the monopolar half-plate is cathodic, and at a periphery thereof, at least two units for an oxidant and at least two units for a fuel,
  wherein none of the oxidant and fuel units of the closure plate comprises any opening which opens at an outer side of the central zone of the closure plate, so that the outer side of the central zone of the closure plate cannot be touched by any of the fuel and the oxidant.

17. Fuel cell comprising an alternate stack of electrode/membranes and bipolar plates which are secured between a cathode end assembly and an anode end assembly,
  wherein at least one of the end assemblies comprises a monopolar end plate according to claim 16,
  wherein at least one of the bipolar plates comprises a cathode monopolar half-plate and an anode monopolar half-plate,
  wherein the cathode monopolar half-plate is secured to the anode monopolar half-plate,
  wherein each of the monopolar half-plates of the bipolar plate comprises, in a central portion thereof, an active cathode or anode zone, respectively, and, at a periphery thereof, at least two units for an oxidant and at least two units for a fuel,
  wherein each of the oxidant or fuel units, respectively, of the respective monopolar half-plates of the bipolar plate comprises at least one channel which opens at the an outer side of the active zone of the respective monopolar half-plate in order to allow the circulation of the oxidant or fuel, respectively, outside the bipolar plate at a side of the respective monopolar half-plate, and
  wherein the central zone of the closure plate is identical to the active zone of the cathode monopolar half-plate of the bipolar plate, if the active zone of the monopolar half-plate is anodic, or to the active zone of the anode monopolar half-plate of the bipolar plate, if the active zone of the monopolar half-plate is cathodic.

18. Monopolar plate according to claim 16, wherein at least the monopolar half-plate comprises, at the periphery thereof, at least two heat-exchange fluid units and wherein the central portion of the monopolar half-plate and the central portion of the closure plate together delimit a space for circulation of a heat-exchange fluid which is in communication, via connection channels, with the heat-exchange fluid units.

19. Fuel cell of the type comprising an alternate stack of electrode/membranes and bipolar plates which are secured between a cathode end assembly and an anode end assembly, wherein at least one end assembly comprises a monopolar end plate according to claim 16 and a means for collecting electrical current.

20. Fuel cell according to claim 19, wherein the means for collecting current is a current-collecting plate which comes into contact with the closure plate of the monopolar end-plate.

* * * * *